INVENTORS
LEWIS S. BILLIG
BENJAMIN T. NEWMAN
BY
ATTORNEY

June 13, 1961 L. S. BILLIG ET AL 2,988,693
SIGNAL AND NOISE LEVEL DETERMINING APPARATUS
Filed Dec. 31, 1957 3 Sheets-Sheet 3

INVENTORS
LEWIS S. BILLIG
BENJAMIN T. NEWMAN
BY
Walter J Kreske
ATTORNEY

United States Patent Office 2,988,693
Patented June 13, 1961

2,988,693
SIGNAL AND NOISE LEVEL DETERMINING
APPARATUS
Lewis S. Billig, Cochituate, and Benjamin T. Newman, Dedham, Mass., assignors to General Electronic Laboratories, Inc., Cambridge, Mass., a corporation of Massachusetts
Filed Dec. 31, 1957, Ser. No. 706,495
10 Claims. (Cl. 324—57)

This invention relates to apparatus for obtaining the signal and the noise levels in signal-plus-noise.

In the measurement of signal-to-noise of signal traversing equipment such as radio receivers, it has been customary to use a two step procedure as follows. The sum of the signal and noise at the output of the receiver is measured. The signal is then turned off and the noise alone is measured at the output of the receiver. With the data so obtained, the signal to noise ratio is then calculated by the mathematical operations $$\frac{(S+N)-N}{N}$$

where S represents the measured signal level and N the measured noise level.

A primary difficulty with this procedure is that an erroneous signal to noise ratio is obtained where the receiver or other equipment under test has non linear amplitude characteristics. Also, when the signal and the noise frequencies are nearly equal, this procedure is subject to appreciable error. Another undesirable aspect of making such calculations is that wherever the human element enters into mathematical manipulations, there is not only an additional undesirable consumption of time, but also the possibility for human error appearing in the results.

Pursuant to the present invention, these problems have been overcome and an apparatus has been devised wherein the measurement of signal and noise levels for determining signal to noise ratios, may be performed without shutting off either the noise or the signal and the measurements of both signal and noise level may be read directly from a meter. Achieving a measurement of the signal level in the presence of noise and noise level in the presence of the signal obviate the need for shutting off or removing either the signal or the noise from the equipment under test and thereby minimizes possible error in results regardless of whether the equipment has linear or non-linear response characteristics.

Other desirable features of the invention are that accurate results over a wide range of signal and noise levels may be obtained. Also, the total noise within the passband of the receiver or other equipment under test can be measured. The measurements of signal level can be made even in the presence of large amounts of noise. In addition, it eliminates the necessity for the use of filters.

Accordingly, a primary object of the present invention is the provision of an apparatus for obtaining the level of an information signal in the presence of noise.

Another object is the provision of an apparatus for obtaining the level of noise in the presence of an information signal.

A further object is the provision of an apparatus for selectively balancing out either the noise or the signal components of combined signal and noise for making possible the measurement of one or the other.

And a further object is the provision of an apparatus applicable to combined noise and information signals for measuring the noise and signal levels separately.

A further object is the provision of an apparatus which is capable of measuring noise in the presence of signal without the use of notch filters to reject the signal so that total noise within the passband of an equipment under test can be measured.

Another object is the provision of an apparatus which is capable of testing signal traversing equipment such as receivers for signal to noise ratio within passband of the equipment without removing the signal or the noise from the input of the equipment.

And a still further object is the provision of an apparatus capable of making accurate signal to noise ratio determinations at the output of the equipment regardless of whether the equipment has linear or non-linear amplitude response characteristics even under conditions where signal and noise frequencies are nearly equal.

And another object is the provision of an apparatus which is applicable to an accurate determination of the effect on the signal to noise ratio by the equipment under test.

These and other objects, features and advantages are achieved generally by providing a source for a signal-plus-noise and a source for the signal free of noise, an electronic circuit coupled to the sources for balancing out the noise from the signal, a second circuit coupled to the sources for balancing out the signal from the noise, and an arrangement for indicating output of the balancing out circuits.

By providing a phase shifting arrangement for the signal and a balanced modulator with the signal output from the phase shifting arrangement applied thereto as the carrier, a suitable arrangement for balancing out the noise is thereby achieved.

By providing a circuit for shifting the phase of the signal by 180° from the signal in the signal-plus-noise, and feeding both to an adder circuit, an arrangement for isolating the noise for measurement is thereby achieved.

By providing a conventional noise generator, carrier signal generator and a single frequency audio information signal generator with provision for the information signal to modulate the carrier signal and provision for adding the output of the noise generator to the modulated carrier and feeding it to the receiver under test, the output of which provides the signal-plus-noise source for the balancing out circuits a relatively simple control arrangement for providing signal to noise ratio determinations on receivers is thereby achieved.

By providing a signal phase shifting arrangement coupled to the information signal generator, and suitable switching circuits coupled for operation selectively with the balanced modulator, the adder, and the meter, the number of phase shifting circuits and meters required for signal to noise ratio measurements is thereby reduced.

These and other features, objects and advantages of the invention will become more apparent from the following description taken in connection with the accompanying drawings of a preferred embodiment of the invention and wherein.

Figure 1:
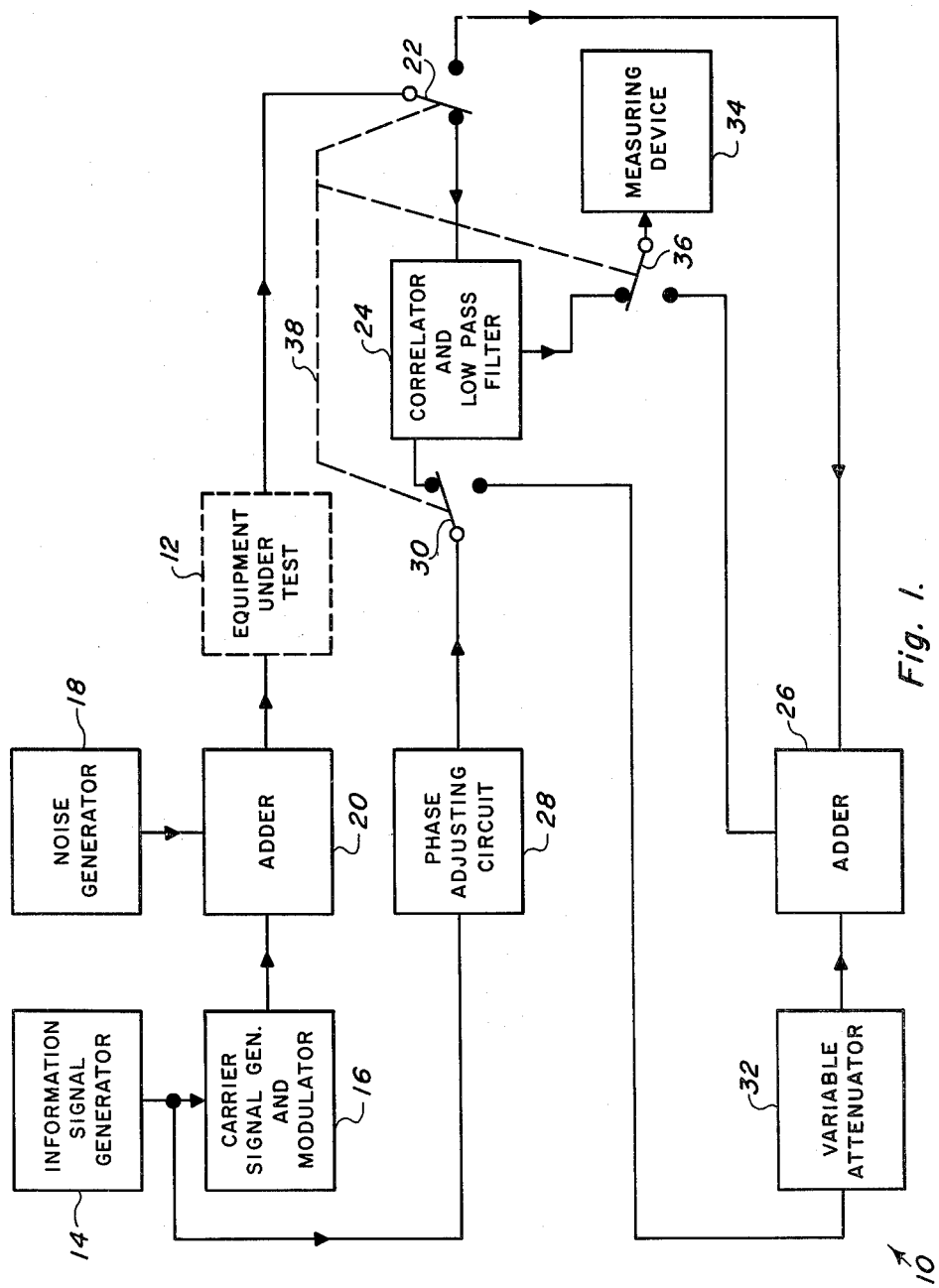
FIG. 1 is a block diagram of a signal and noise measuring apparatus constructed in accordance with the present invention and arranged to make tests on a signal traversing equipment.

Referring to FIG. 1 in more detail, an apparatus for measuring signal and noise in accordance with the present invention is designated generally by the numeral 10. While the apparatus 10 in FIG. 1 is arranged particularly for testing the noise and signal output of a selected equipment under test 12 such as a radio receiver, it will become apparent as this description progresses that noise and signal tests may also be performed on other signal traversing equipment as transmitters, amplifiers and the like. A sine wave, preferably a single frequency sine wave, from a signal generator 14 is used as the information signal for running tests on the receiver under test 12. The single frequency information signal from the signal generator 14 is fed as the modulating signal to a conventional radio frequency carrier signal generator and modulator 16. At the same time the noise output from a suitable noise generator 18 is fed with the modulated output of the carrier signal generator 16 through a signal adder circuit 20 to the receiver under test 12. The controls of the receiver 12 are set to a receiving frequency and volume etc. desired for the test. The output of the receiver under test 12 is fed through a switch 22, selectively to either a correlator and low pass filter 24 or to a conventional signal adder circuit 26, to be hereinafter more fully described. Simultaneously, the information signal from the signal generator 14 is fed through a phase adjusting circuit 28 and a switch 30 selectively to the correlator and low pass filter 24 or through a variable signal attenuator 32 such as a variable resistor circuit to the signal adder 26.

A suitable electric signal measuring device 34 is selectively coupled through a third switch 36 to receive the output of the correlator and low pass filter 24 or the output of the adder 26. The switches 22, 30 and 36 are coupled by a suitable linkage 38 such that the respective switches 30, 22, and 36 operate together to couple the measuring device 34 to the correlator and low pass filter 24 when the output of the equipment under test 12 and the phase adjusting circuit 28 is fed to the correlator 24, and to couple the measuring device 34 to the output of the adder 26 when the equipment under test 12 and the phase adjusting circuit 28 are coupled to the adder 26.

In the operation of the apparatus 10 for the measurement of the information signal intensity at the output of the equipment under test 12, the switches 22, 30 and 36 are arranged to feed the correlator 24 with the output of the equipment under test 12 and with the output of the phase adjusting circuit 28, while the output of the correlator and low pass filter 24 feeds the measuring device 34.

The correlator 24 is essentially a balanced modulator, as will be more fully described in connection with FIGS. 2 and 3 hereof, with its carrier voltage provided by the signal from the phase adjusting circuit 28. The output of the correlator 24 is the product of the signal and signal-plus-noise from the receiver 12 existing in the upper and lower sidebands produced by the modulator or correlator 24. The output of the modulator of the correlator 24 terminates in a low pass filter which removes the upper sideband produced in the modulator. In this manner a D.C. voltage is obtained which is proportional only to the amount of signal at the output of the receiver 12. The D.C. voltage so produced is fed through the switch 36 to the measuring device 34 for measurement and indication on the measuring device 34. The phase adjusting circuit 28 is adjusted for maximum indication by the measuring device 34.

In the operation of the apparatus 10 for the measurement of the noise signal intensity at the output of the equipment under test 12, the switches 22, 30 and 36 are arranged by manipulating the linkage 38 to couple the phase adjusting circuit 28 through the variable attenuator 32 to the adder 26, and to couple the equipment under test 12 to the adder 26 and the measuring device 34 to the adder 26. As will become more apparent from the following description in connection with FIG. 2, this structure includes a diode voltage coupler and a resistor capacitor filter which has a time constant appropriate to the peak factor of random noise, an amplifier for amplifying the output of the filter, and a suitable calibrated meter to indicate this amplified output.

To measure the noise in the output of the equipment under test, the phase adjusting circuit 28 and the variable attenuator are adjusted to set the phase and amplitude respectively, of the signal from the signal generator 14 to exactly cancel the information signal from the output of the receiver 12 in the adder 26. This adjustment is made by noting the null point as indicated on the meter in the measuring device 34. The resulting reading on the meter will be that of the noise level alone.

Having thus obtained separate measures of the signal and the noise, the calculation of the signal to noise ratio is carried out by the simple mathematical operation of directly setting down the readings as read on the meter in the measuring device 34 in the ratio $S/N$. These measurements having been made while both signal and noise are present, non-linearities in the receiver 12 are automatically taken into account in these measured results.

Figure 2:
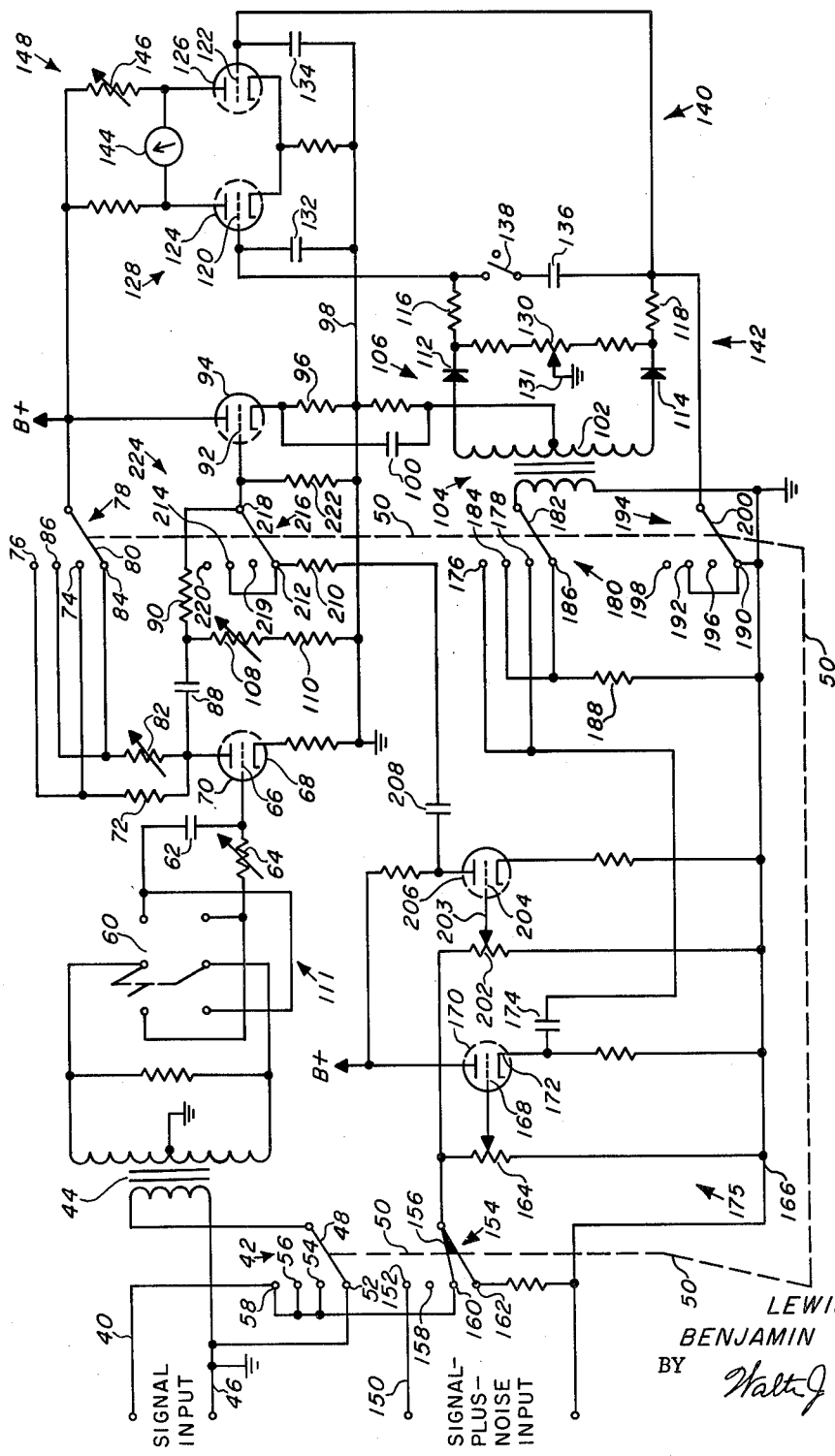
FIG. 2 is a schematic diagram of a second embodiment of the invention which also illustrates circuits suitable for use in certain of the components illustrated in block form in FIG. 1.

Referring to FIG. 2 in more detail, a schematic illustration is arranged to show some of the circuits suitable for use in FIG. 1 as well as suitable modifications over the general embodiment of FIG. 1 to provide for convenience in initial calibration and setting of values for subsequent tests and to provide for economies in construction and reliability in operation. In the embodiment in FIG. 2 a single frequency sine wave information signal from the information signal generator 14 is fed through line 40 and information signal switch 42 to one side of a primary of a transformer 44, the other side of which is connected to a grounded line 46. The switch 42 has a movable switch arm 48 connected by a suitable linkage 50 to operate simultaneously with other switches to be hereinafter further described. The switch 42 also has four terminals 52, 54, 56 and 58 for selective electrical engagement by the movable switch arm 48 to perform selected operative functions of the embodiment in FIG. 2 as will become more apparent as this description progresses.

A centertapped secondary of the transformer 44 is coupled through a double pole, double throw, phase reversing switch 60 across a capacitor 62, variable coarse phase adjusting resistor 64 connected to a control grid 66 of an electron amplifier tube 68 such as a triode. The amplifier tube 68 has a plate 70 coupled through a fixed resistor 72 to terminals 74 and 76 of a power source switch 78 having a movable switch arm 80 connected to the linkage 50 for synchronized operation with the information signal switch 42. The plate 70 is also coupled through a signal amplitude adjusting variable resistor 82 to terminals 84 and 86 in the power source switch 78. The plate 70 is also coupled through a coupling capacitor 88 and an adder resistor 90 to a control grid 92 of a cathode follower electron tube 94 such as a triode having its plate coupled to a B+ power source and a cathode coupled through a resistor 96 to a ground line 98, and through a coupling capacitor 100 to the center tap of a secondary 102 of a transformer 104 in a balanced modulator 106. The plate 70 of the amplifier tube 68 is also connected through the capacitor 88 and series resistor 108 and 110 to the ground line 98. Series resistor 108 is preferably a variable resistor to provide a fine phase adjustment of the amplified signal from the amplifier tube 68. The transformer 44, phase reversing switch 60, coarse phase adjusting variable resistor 64, capacitor 62 and amplifier 68, together with the fine phase adjusting variable resistor and associated circuitry provide a suitable phase adjusting circuit which may be used as the phase adjusting circuit 28 hereinabove described.

The ends of the secondary 102 of the transformer 104 are coupled through diodes 112 and 114 and resistors 116 and 118 respectively to control grids 120 and 122 in a pair of electron tubes 124 and 126 respectively in a differential amplifier circuit 128. A series resistor chain with a variable resistor 130 having a grounded balance adjusting tap 131 is connected across the diodes 112 and 114. The control grids 120 and 122 of the differential amplifier 128 are also coupled through capacitors 132 and 134 respectively to the ground line 98. The resistors 116 and 118 and capacitors 132 and 134 together with a capacitor 136 which may be selectively used in the circuit by means of the switch 138, form a suitable low pass filter 140 for the output of the modulator 106 which removes the upper sideband of the balanced modulator 106 and produces a voltage which is proportional only to the amount of signal at the output of the modulator 106. The modulator 106 and low pass filter 140 form a suitable correlator and low pass filter circuit 142 which is also suitable for use as the correlator and low pass filter circuit 24 described in connection with FIG. 1.

A suitable voltmeter is connected across the plates of the triodes 124 and 125 in the differential amplifier circuit 128. The plate circuit of the electron tube 126 has a variable resistor 146 for providing a convenient zero adjustment for the voltmeter 144. The differential amplifier 128 and meter 144 with associated circuitry form a suitable measuring device 148 usable as the measuring device 34 illustrated in block form in FIG. 1.

Signal-plus-noise input such as that from the equipment under test 12 is fed through a line 150 to a terminal 152 in a signal-plus-noise supply switch 154 having a dual movable switch arm 156 operated by the linkage 50 in unison with the movable switch arm 48 in the information switch 42. The signal-plus-noise switch 154 also includes terminals 158, 160 and 162 for operation as will be herein further described. The movable switch arms 156 are coupled through a potentiometer resistor 164 to a ground line 166 and through a variable tap on the potentiometer resistor 164 to a control grid of a cathode follower 170. The cathode follower 170 has a cathode 172 coupled through a capacitor 174 to terminals 176 and 178 in a modulator input switch 180 having a movable arm 182 fixed to the linkage 50 for operation in unison with the signal input switch 42. The modulator input switch 180 also has terminals 184 and 186 coupled through a resistor 188 to the ground line 166. The potentiometer resistor 164 and cathode follower stage 170 with associated circuitry provide a suitable variable attenuator circuit 175 for use as the variable attenuator 32 shown in block form in FIG. 1.

The ground line 166 is also selectively coupled through terminals 190 and 192 in a grounding switch 194 to the control grid 122 of the differential amplifier 128. The grounding switch 194 also has open terminals 196 and 198 for operation with a movable adjusting arm 200 coupled to the linkage 50 for operation in unison with the information signal switch 42.

The dual switch arms 156 are also coupled through a noise calibrating potentiometer resistor 202 to the ground line 166 and through a variable pick-off 203 to a control grid 204 of an amplifier stage 206. The plate circuit of the amplifier stage 206 is coupled through a capacitor 208 and an adder resistor 210 to terminals 212 and 214 in an adder switch 216 having a movable switch arm 218 connected to the linkage 50 for operation in unison with the signal switch 42. The adder switch 216 also has open terminals 219 and 220. A resistor 222 coupled from the control grid of the cathode follower 94 to the ground line 98, may be the same value as the resistors 210 and 90 and together with the cathode follower stage 94 and associated circuitry form a suitable adder circuit 224 usable as the adder circuit 26 shown in block form in FIG. 1.

In the operation of the embodiment shown in FIG. 2, with the switches in position as shown, calibration for noise measurement may be carried out. Inasmuch as the primary of the transformer 44 in the phase adjusting circuit 111 is grounded through switch arm 48, terminal 52 and ground line 46, there will be no information signal appearing through the adder resistor 90. Instead, the single frequency signal from the information signal generator will appear through the line 40, terminal 58, terminal 160, switch arm 156 and potentiometer resistor 202 at the control grid 204. This information signal, suitably amplified in the amplifier stage 206 will appear through the capacitor 208, adder resistor 210, terminal 212, switch arm 218, and the cathode follower 94 at the center tap of the secondary 102 of the transformer 104. Inasmuch as the switch arm 200 in the grounding switch 194 grounds the line to control grid 122 in the differential amplifier 128, only a D.C. component as the output of the rectifier 122 and the resistor capacitor filter 140 will appear at control grid 120 in the differential amplifier 128. It will be noted that inasmuch as the primary 104 is grounded through switch arm 182, terminal 186 and a low value ohmic resistor 188 to the ground line 166, there will be no input from the primary of the transformer 104. By suitable adjustment on the potentiometer 202 under a controlled signal input from the line 40, provision may be made for full scale deflection on the meter 144. Also, the variable resistor 146 may be adjusted for providing suitable zero position of the indicator on the meter 144. Such calibration is based on the estimated noise intensity which is to be measured as will be hereinafter further described. The estimate as herein set on the variable resistor 202 provides for full scale deflection on the meter 144 at maximum estimated noise level.

Having calibrated the FIG. 2 embodiment for noise level, the linkage 50 may then be used to simultaneously move the switch arm 48 to the terminal 54, switch arm 156 to the terminal 160 and 158, switch arm 182 to the terminal 178, switch arm 200 to the terminal 196, the switch arm 218 to the terminal 219 and the switch arm 80 to the terminal 74. In this new switching position the FIG. 2 embodiment is ready for calibration for signal measurement. Adjustment for such calibration is made on the potentiometer 164.

In this new position of the switches the single frequency sine wave signal from the information signal generator 14 will appear through line 40, terminal 160 and switch arm 156 through the potentiometer resistor 164, the cathode follower 170, coupling capacitor 174, terminal 178, switch arm 182, the primary of the transformer 104, the secondary 102 of the transformer 104 and across the rectifiers 112 and 114. The single frequency signal from the information signal generator 14 will also appear through line 40, terminal 54, switch arm 48, primary of the transformer 44 and thereby the secondary of the transformer 44, the switch 60 which is closed for a selected phase relation, amplifier stage 68, cathode follower 94, coupling capacitor 100 at the center tap of the secondary of the transformer 104 in the balanced modulator 106. The coarse phase on the variable resistor 64 and the fine phase on the variable resistor 108 are adjusted for maximum deflection on the meter 144. The calibration potentiometer 164 is then adjusted for a full scale deflection on the meter 144 for a desired maximum operating signal intensity which is to be measured as will be hereinafter further described.

With the calibrations having been made as described, measurement of the noise component in the signal-plus-noise output of the receiver under test 12 is performed by moving the switches by means of the linkage 50 so that the switch arm 48 is on terminal 56, switch arm 156 is on terminals 158 and 152, switch arm 182 is on terminal 184, switch arm 200 is on terminal 192, switch arm 218 is on terminal 214, switch arm 78 is on terminal 86. With the switches on these new noise measuring positions, the signal-plus-noise output from the receiver under test 12 will appear through the line 150, terminal 152, switch arm 156, potentiometer resistor 202, amplifier stage 206, coupling capacitor 208 adder resistor 210, terminal 214, switch arm 218, cathode follower 94 coupling capacitor 100, the center tap on the secondary 102 of the transformer 104, the rectifier 112, resistor 116, at the control grid 120 of the electron tube 124 in the measuring device 148. The control grid 122 of the electron tube 126 in the measuring device 148 is grounded through the switch arm 200, terminal 192, and the ground line 166. Simultaneously with the signal-plus-noise in the line 150, the single frequency signal, free of noise, will appear from the information signal generator 14 in the line 40, terminal 58, switch arm 48, the primary of the transformer 44 and thereby the secondary, the switch 60 which is closed in the selected direction for proper phase relation as will be described, the amplifier stage 68, adder resistor 90 at the control grid 92 together with the signal-plus-noise from the adder resistor 210. The information signal and the signal-plus-noise will then appear through the coupling capacitor 100, the center tap on the secondary 102 of the transformer 104, rectifier 112, resistor 116 at the control grid 120 of the electron tube 124 of the differential amplifier 128. The switch 60, together with the coarse phase adjusting resistor 64 and the fine phase adjusting resistor 108 are adjusted for a minimum deflection on the meter 144. The minimum deflection on the meter 144. The minimum deflection on meter 144 occurs when the single frequency signal from the phase adjusting circuit 111 is exactly 180 degrees out of phase with the signal in the signal-plus-noise appearing through the adder resistor 110. The signal having been in this manner cancelled from the signal-plus-noise appearing in the adder circuit 224, only the noise will appear through the rectifier 112 and the differential amplifier 128 for measurement on the meter 144. Thereby, the measurement on the meter 144 will be a direct measurement of the noise intensity at the output of the receiver under test 12.

For the measurement of the signal in the signal-plus-noise output of the receiver under test 12, the linkage 50 is moved to cause switch arm 48 to engage the terminal 58, switch arm 156 to engage the terminal 152, switch arm 182 to engage the terminal 176, the switch arm 200 to engage the terminal 198, the switch arm 218 to engage the terminal 220, and the switch arm 80 to engage the terminal 76. With the switches in this signal measuring position, the signal-plus-noise from the receiver under test 12 will appear through line 150, terminal 152, switch arm 156, potentiometer resistor 164, cathode follower 170, coupling capacitor 174, terminal 176, switch arm 182, the primary of the transformer 104, the secondary 102 of the transformer 104 at the rectifiers 112 and 114 in the balanced modulator 106. Simultaneously, the signal free of noise will appear from the information signal generator 14, in the line 40, terminal 58, switch arm 48, the primary of the transformer 44, the secondary of the transformer 44, the appropriate terminals of the switch 60, the amplifier stage 68, coupling capacitor 88, resistor 90, cathode follower 94 coupling capacitor 100, at the center tap of the secondary 102 of the transformer 104 to trigger the rectifiers 112 and 114. By proper positioning of the switch 60, the coarse phase adjusting resistor 64 and fine phasing adjusting resistor 108, in the phase adjusting circuit 111, a maximum output from the balanced modulator 106 is obtained and indicated on the meter 144. The termination of the balanced modulator 106 in the low pass filter 140 causes a D.C. voltage which is proportional to the amount of signal at the output of the receiver under test 12. This is the voltage which is read on the meter 144. The reason for this is better understood by visualizing a sine wave signal input in line 40 and the same sine wave plus noise in line 150. In such case, the sine wave signal will appear from coupling capacitor 100 at the centertap of the secondary 102 and thereby simultaneously at each of the rectifiers 112 and 114 in the same phase. On the other hand, the sine wave signal-plus-noise across the primary of the transformer 104 will appear at rectifier 112 one hundred and eighty degrees out of phase with the sine wave signal-plus-noise at rectifier 114 because of the rectifiers 112 and 114 being connected at opposite ends of the secondary 102. Thus, if the phase between the sine wave signal and the sine wave signal-plus-noise are the same at rectifier 112, they will be 180° out of phase at rectifier 114. Therefore, each time the sine wave signal at rectifier 112 is sufficiently positive to trigger rectifier 112, the sine wave signal-plus-noise being in the same phase, will pass through to charge capacitor 132. At the same instant, however, no current will pass through the rectifier 114 because the sine wave signal-plus-noise, being 180° out of phase, is at negative potential. Then 180° degrees later there would still be no current flow through rectifier 114 because the triggering sine wave signal is then too negative to allow current through the rectifier 114 even though the sine wave signal-plus-noise is positive at that instant. In each instant, however, the bias on the rectifiers 112 and 114 are such that the positive amplitudes caused by noise are passed through the rectifiers to charge capacitors 132 and 134 respectively. Since noise by its nature is random, the charge on both capacitors 132 and 134 from the noise component will be the same. Because of this cancelling effect, there will be no voltage differential from the noise appearing on the meter 144.

In the event of the measurement of noise or signal as described above, where the noise in fact includes a frequency which is close to the frequency of the information signal from the information signal generator 114, it may be necessary to add further capacity to the low pass filter 140. In such instance the capacitor 136 is provided with switch 138 which may be for inserting or removing the capacitor 136 in the low pass filter circuit 140, as desired.

Figure 3:
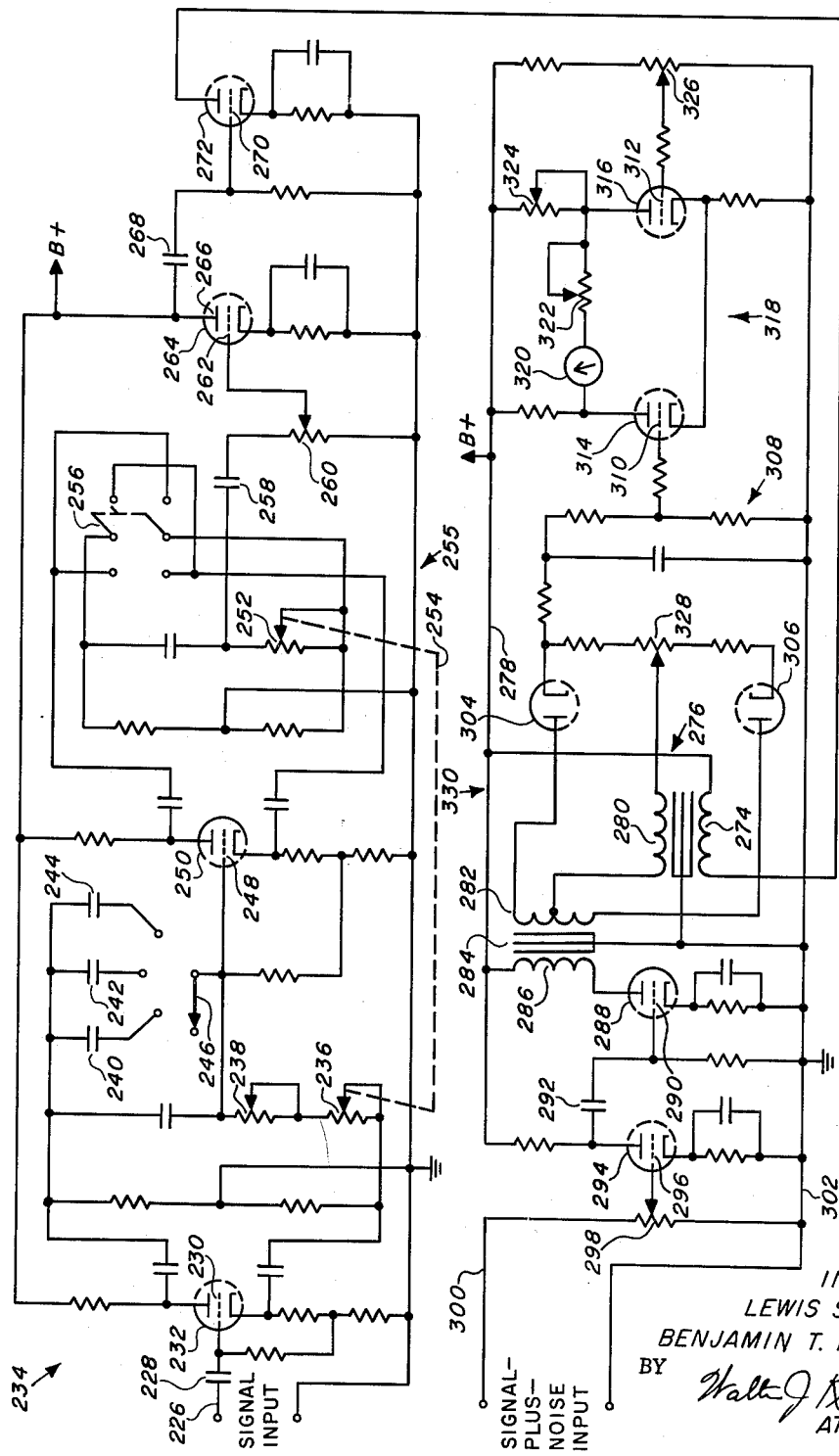
FIG. 3 is a schematic diagram illustrating additional circuits suitable for use in the embodiments of FIGS. 1 and 2.

Suitable alternative circuits for use as the phase adjusting circuit 28 in the correlator and low passed filter 24 in the measuring device 34 is shown schematically in FIG. 3. Referring to FIG. 3 in more detail, the single frequency sine wave from the information signal generator 14 is fed through a line 226 and a coupling capacitor 228 to a control grid 230 of an electron tube 232 in the first stage of a phase splitting circuit 234 in the output of which is a coarse phase adjusting resistor 236 and a fine phase adjusting resistor 238. Also in the output of the phase splitting stage 132 are capacitors 240, 242 and 244 of different values appropriate for selection by a switch 246 for selecting the phase frequency range of operation desired. The output of the first phase splitter stage 232 is fed to a control grid 248 of a second phase splitter stage 250 in the output of which is a phase adjusting resistor 252 coupled by a suitable linkage 254 to the coarse phase adjusting resistor 236 for simultaneous operation therewith. The output of the second phase splitter stage 250 also includes a double pole double throw phase reversing switch 256. The output of the second phase splitter stage 250 in a phase shifting circuit 255 is fed through a coupling capacitor 258 and potentiometer resistor 260 to a control grid 262 of an electron tube 264 having a plate 266 coupled through a capacitor 268 to a control grid 270 of another electron tube 272. The plate circuit of the tube 272 is fed through a transformer primary 274 of a transformer 276 connected to the B+ potential line 278. The transformer 276 has a secondary 280 having one side coupled to a center tap on a secondary 282 of another transformer 284 having a primary 286 in the plate circuit of an electron tube 288. The electron tube 288 has a control grid 290 fed through a coupling capacitor 292 from the plate output of an amplifier electron tube 294 having a control grid 296 which is fed from a potentiometer resistor 298 coupled by a line 300 and ground line 302 to the output of the receiver under test 12 for the signal-plus-noise output of the receiver under test 12. The secondary 282 of the transformer 284 is coupled at its ends through a pair of rectifiers 304 and 306 respectively and a low pass capacitor resistor filter network 308 to the control grid 310 and 312 of a pair of electron tubes 314 and 316 respectively in a differential amplifier circuit 318. A suitable meter 320, such as the meter 144 in FIG. 2, may be connected across the plates of the electron tubes 314 and 316 with a series meter range adjusting variable resistor 322. The plate circuit of the electron tube 360 may have a potentiometer resistor 324 for providing compensating adjustment in the circuit, and a variable resistor 326 for providing zero adjustment on the meter 320. The other end of the secondary 280 of the transformer 276 is connected to a variable center tap on a balancing resistor 328. The transformers 276 and 284, rectifiers 304 and 306 and resistor network 328 provide a balanced modulator arrangement 330 which together with the low pass filter 308 are suitable for use as the correlator and low pass filter 24 in FIG. 1. The phase splitting circuit 234 and the phase shifting circuit 255 together are suitable for use as the phase adjusting circuit 28.

In the operation of the circuit shown in FIG. 3, for measuring signal level in the signal-plus-noise output of the receiver under test 12, the single frequency signal from the information signal generator 14 free of noise is fed through the line 226, the phase splitter circuit 234 and phase shifting circuit 255, electron tubes 264 and 272, through the primary 274 and thereby the secondary 280, the center tap of the secondary 282 to the rectifiers 304 and 306 respectively. The signal-plus-noise output from the receiver under test 12 appears in the primary 286 as described above. The variable resistors 236 and 252, phase reversing switch 256, the switch 246 and the fine phase adjusting resistor 238 are adjusted for maximum reading of the meter 220 which by proper adjustment of the variable resistor 298 in the manner which is described in respect to FIG. 2 will directly indicate the signal intensity in the signal-plus-noise output of the receiver 12.

For proper operation of the balanced modulator 330, the amplitude of the reference signal in the secondary must be sufficient to govern the switching of the diodes 304 and 306. During a positive half cycle of the single frequency reference signal, both diodes must remain in conduction, during the other half cycle must remain in a nonconducting state. Thus during the conduction half cycle the desired signal component causes an increase in the current in one diode and a decrease in the other, resulting in an average direct voltage appearing across load resistance. This voltage is proportional to the amount of desired signal at the output of the receiver 12. By means of the differential amplifier 318 and meter 320, calibrated as described, a direct reading on the meter 320 for the desired signal can be obtained.

The modulator in the present embodiments are particularly adapted for operation in the audio frequency range. In the event higher frequency response is desired, any suitable balanced modulator arrangement using the principles herein described and shown may be used. For example a phase splitter such as described in connection with FIG. 3 may be used in conjunction with a transistor circuit such as shown in Section 16 of the publication entitled "The Handbook of Semiconductor Electronics" published by McGraw-Hill Book Company, dated 1956.

This invention is not limited to specific details of construction and operation herein described as equivalents will suggest themselves in those skilled in the art.

What is claimed is:

1. In an apparatus for determining the level of signal in signal-plus-noise, the combination of means for varying the phase of said signal free of noise, a balanced modulator coupled to said signal phase varying means arranged for modulating said signal by the signal-plus-noise, and means coupled to said modulator for obtaining the lower sideband output of the modulator.

2. In an apparatus for measuring the signal in signal-plus-noise, the combination of a balanced modulator, means for applying said signal free of noise and the signal-plus-noise to the modulator in manner to modulate the signal by the signal-plus-noise, means coupled to said modulator for measuring the lower sideband output of the modulator, and means coupled to said applying means for varying the phase of said signal free of noise for maximum output to said measuring means.

3. In an apparatus for obtaining the signal in signal-plus-noise, the combination of means for adjusting the phase relation between said signal and signal-plus-noise, means coupled to said adjusting means for modulating one by the other of said signal and signal-plus-noise, and means coupled to said modulating means for obtaining a sideband output of said modulator.

4. In an apparatus for measuring the signal and the noise levels in the signal-plus-noise output of a radio receiver, the combination of a single frequency audio signal source, a carrier signal generator and modulator coupled to the audio signal source for modulating the carrier by the single frequency audio signal, a noise source, adder means coupled to the carrier modulator and noise source for applying the modulated carrier-plus-noise to the receiver, a balanced modulator and low pass filter means, a second adder means, means coupled to said single frequency signal source for varying the phase of said single frequency signal, means for coupling said signal phase varying means and receiver output to said balanced modulator means and second adder means, and means for measuring the outputs of said low pass filter means and second adder means.

5. In an apparatus for measuring the signal and the noise levels in the signal-plus-noise output of an electric signal traversing device, the combination of a single frequency signal source, means for applying the signal from said source to said device, means coupled to the signal source for varying the phase relation between said single frequency signal and the output of the signal traversing device, a balanced modulator and low pass filter means, electric signal adder means, means coupled to the phase varying means, the balanced modulator means and signal adder means for applying said relative phase varied signal and device output to the balanced modulator and adder means, and means for measuring the outputs of said low pass filter means and adder means.

6. In an apparatus for measuring the signal and the noise levels in the signal-plus-noise output of an electric signal traversing device, the combination of a single frequency signal source, means for applying the signal from said source to said device, means for varying the phase between said single frequency signal and the output of the signal traversing device, a balanced modulator and low pass filter means, electric signal adder means, electric signal level measuring means, and switch means coupled to said phase varying, balanced modulator, adder and measuring means for selectively applying said relative phase varied signal and device output to said modulator simultaneously with the low pass filter output to said measuring means and said relative phase varied signal and device output to said signal adder simultaneously with said adder output to said measuring means.

7. In an apparatus for measuring the signal level in signal-plus-noise, the combination of a phase splitter, means for applying said signal to the phase splitter, phase shifting means coupled to the phase splitter, a balanced modulator having a pair of input circuits and an output circuit, means for coupling the phase shifting means to one of the input circuits, means for applying the signal-plus-noise to the other input circuit, low pass filter means coupled to the output circuit, and electric signal level measuring means coupled to the low pass filter means.

8. In an apparatus for measuring the signal level in signal-plus-noise, the combination of a phase splitter, means for applying said signal to the phase splitter, phase shifting means coupled to the phase splitter, a balanced modulator having a carrier input circuit, a modulation input circuit and an output circuit, means for coupling the phase shifting means to the carrier input circuit, means for applying the signal-plus-noise to the modulation circuit, low pass filter means coupled to the output circuit, and electric signal measuring means coupled to the low pass filter means.

9. A device for extracting the signal from signal-plus-noise comprising a pair of diodes each having an anode and cathode, a signal-plus-noise input transformer with a secondary having one end electrically coupled to one of the anodes and the other end electrically coupled to the other anode, resistor means electrically coupled across said cathodes, a signal transformer with a primary and a secondary, the secondary having one end electrically coupled to a center position on said signal-plus-noise transformer secondary and another end adjustably coupled to a center position on said resistor means, signal-plus-noise applying means coupled to the primary of the signal-plus-noise transformer, signal applying means coupled to the primary of the signal transformer and electric signal measuring means coupled to the resistor means.

10. A device for extracting the signal from signal-plus-noise comprising a signal-plus-noise input transformer having a primary and a secondary, resistance means having a grounded center tap coupled across said secondary, a diode electrically interposed between the resistor and each side of the secondary, means for applying the signal-plus-noise to the primary, means for applying said signal to a center position on said secondary, and electric signal measuring means coupled to said resistor.

References Cited in the file of this patent

UNITED STATES PATENTS

| | | |
|---|---|---|
| 2,694,142 | Laidig | Nov. 9, 1954 |
| 2,794,156 | Mohler et al. | May 28, 1957 |
| 2,808,562 | French et al. | Oct. 1, 1957 |
| 2,891,217 | Grieg et al. | June 16, 1959 |